(12) United States Patent
Miyamura et al.

(10) Patent No.: US 10,818,319 B1
(45) Date of Patent: Oct. 27, 2020

(54) READ ERROR RECOVERY IN A TAPE DRIVE

(71) Applicant: INTERNATIONAL BUSINESS MACHINES CORPORATION, Armonk, NY (US)

(72) Inventors: Tsuyoshi Miyamura, Yokohama (JP); Setsuko Masuda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/661,039

(22) Filed: Oct. 23, 2019

(51) Int. Cl.
| G11B 5/09 | (2006.01) |
| G11B 19/04 | (2006.01) |
| G11B 5/56 | (2006.01) |
| G11B 5/008 | (2006.01) |
| G11B 20/18 | (2006.01) |

(52) U.S. Cl.
CPC ........ *G11B 19/041* (2013.01); *G11B 5/00817* (2013.01); *G11B 5/56* (2013.01); *G11B 2020/183* (2013.01)

(58) Field of Classification Search
None
See application file for complete search history.

(56) References Cited

U.S. PATENT DOCUMENTS

| 8,705,199 | B2 | 4/2014 | Saliba | |
| 8,824,083 | B1 | 9/2014 | Kientz | |
| 9,177,580 | B1* | 11/2015 | Vanderheyden | G11B 5/584 |
| 10,014,019 | B2 | 7/2018 | Ahmad | |
| 10,056,099 | B1* | 8/2018 | Nylander-Hill | G11B 5/40 |
| 10,170,152 | B1* | 1/2019 | Hoerger | G11B 23/042 |
| 2010/0014189 | A1* | 1/2010 | Masuda | G11B 5/584 |
| | | | | 360/77.12 |
| 2011/0128645 | A1* | 6/2011 | Masuda | G11B 5/4893 |
| | | | | 360/60 |
| 2016/0365111 | A1* | 12/2016 | Partee | G11B 20/12 |

FOREIGN PATENT DOCUMENTS

| JP | 01082308 A | * | 3/1989 | ............. F04B 41/02 |
| JP | 11353629 A | | 12/1999 | |
| JP | 2005259198 A | | 9/2005 | |
| WO | 2010016365 A1 | | 2/2010 | |

* cited by examiner

*Primary Examiner* — Peter Vincent Agustin
(74) *Attorney, Agent, or Firm* — Richard A. Wilhelm

(57) ABSTRACT

A read error occurs when performing a read with a first read head. It is determined whether a second read head capable of use in a read-while-write operation runs within or outside of a first track. The second read head width defines a verified area on a track. If the second read head runs entirely within the first track, the first read head is positioned within the verified area. If the second read head runs partly outside of the first track, and a portion of the verified area within the first track is wider than the width of the first read head, the first read head is positioned within the portion of the verified area that is within the first track. If the portion is not wider, the first read head is positioned so that a side of the first read head is at a border the first track.

21 Claims, 16 Drawing Sheets

TRACK PITCH/HEAD SIZE/DENSITY

| | LTO3 | LTO4 | LTO5 | LTO6 | LTO7 |
|---|---|---|---|---|---|
| TRACK PITCH ($\mu m$) | 14.3 | 11.5 | 8.1 | 4.75 | 2.88 |
| WRITE HEAD WIDTH ($\mu m$) | 20.2 | 14.3 | 11.5 | 8.1 | 4.75 |
| READ HEAD WIDTH ($\mu m$) | 6.5 | 5.3 | 3.8 | 2.8 | 2.3 |
| LENGTH OF 1DS (mm) | 107.36 | 81.66 | 102.98 | 102.98 | 84.02 |
| SIZE OF 1DS (byte) | 1616943 | 1589300 | 2472040 | 2472040 | 5031000 |
| TRACKS | 16 | 16 | 16 | 16 | 32 |
| SPACE FOR A BYTE ($\mu m^2$) | 15.192 | 9.454 | 5.399 | 3.166 | 1.539 |
| DEPTH FOR A BIT ($\mu m$) | 0.133 | 0.103 | 0.083 | 0.083 | 0.067 |

READ ERROR RECOVERY IN A TAPE DRIVE

BACKGROUND

The present disclosure relates to data storage systems, and more particularly to recovering from a read error when reading data stored on tape media.

In a data storage system in which data is stored on magnetic tape media, magnetic transducers read data from and write data onto the magnetic recording media. Data is written on the magnetic recording media by moving a write head having a magnetic recording transducer to a position over the media where the data is to be stored. The magnetic recording transducer then generates a magnetic field, which encodes the data into the magnetic media. Data is read from the media by positioning a read head having a magnetic read transducer over the region of the media where the data is stored and then sensing the magnetic field of the magnetic media.

SUMMARY

Various embodiments are directed to a method for read error recovery in a tape drive. The method may include performing a read operation using a first read head. The read operation reads a first data set stored on a first track of a tape media. The first read head has a width, the first track has a track width, and the read operation includes positioning the first read head at the center of the first track. The method may include determining that a read error occurred when performing the read operation. In response to determining that a read error occurred when performing the read operation, the method may include performing an error recovery procedure. The error recovery procedure may include: determining whether a second read head of a drive capable of use in a read-while-write operation is configured to run entirely within or run partly outside of the track width of the first track. The second read head has a width corresponding with a particular tape drive generation and the width for the second read head defines a verified area on a track. The error recovery procedure may also include: in response to determining that the second read head is configured to run entirely within the track width of the first track, positioning the first read head at a second position. The second position may be within the verified area of the second read head.

In various embodiments, the error recovery procedure further comprises: performing a read operation using the first read head at the second position.

In various embodiments, the error recovery procedure further comprises: selecting a first tape drive generation as the particular tape drive generation from a set of tape drive generations that are capable of writing the data set on the tape media.

In various embodiments, the error recovery procedure further comprises: performing a read operation using the first read head at the second position; determining that a read error occurred when performing the read operation at the second position; and in response to determining that a read error occurred when performing the read operation at the second position, selecting a second tape drive generation as the particular tape drive generation from a set of tape drive generations that are capable of writing the data set on the tape media.

In various embodiments, the error recovery procedure further comprises: in response to determining that the second read head is configured to run partly outside of the track width of the first track, determining whether a portion of the verified area within the track width of the first track is wider than the width of the first read head; in response to determining that the portion of the verified area within the track width of the first track is wider than the width of the first read head, positioning the first read head at a second position, the second position being within the portion of the verified area of the second read head within the track width of the first track; and performing a read operation using the first read head at the second position.

In various embodiments, the error recovery procedure further comprises: in response to determining that the second read head is configured to run partly outside of the track width of the first track, determining whether a portion of the verified area within the track width of the first track is wider than the width of the first read head; in response to determining that a portion of the verified area within the track width of the first track is not wider than the width of the first read head, positioning the first read head at a second position, the second position being within the portion of the verified area of the second read head within the track width of the first track, and being a position in which a side of the first read head is at a border of the first track; and performing a read operation using the first read head at the second position.

In various embodiments, the error recovery procedure further comprises: determining whether a data set information table was successfully read from the track; in response to determining that the data set information table was successfully read from the track, setting a tape drive generation stored in the data set information table as the particular tape drive generation.

Further, various embodiments are directed to a method for read error recovery in a tape drive, comprising: positioning a first read head of the tape drive at a center of a track of a tape with data written thereon to read the data when a request for reading the data is received. In addition, the method may include: determining a head shift width when an error occurs during a read back operation; and repositioning the first read head by: setting the first read head at a position in a range of a second read head position, the second read head being associated with a write head of a write drive that wrote the data, if the second read head of the write drive that wrote the data runs on a track pitch of a tape format of the tape.

In an additional embodiment, the method for read error recovery in a tape drive may further comprise: setting the first read head at a position within the track pitch of a second read head position, the second read head being associated with a write head of a write drive that wrote the data, if the second read head of the drive that wrote the data runs across a border of a track pitch of a tape format of the tape, and a valid data width within the track pitch is wider than a width of the first read head.

In an additional embodiment, the method for read error recovery in a tape drive may further comprise: setting the first read head at a position at an edge of a track pitch of a tape format of the tape that a write head crossed on writing the data when a second read head associated with the write head that wrote the data runs across a track pitch border of a tape format of the tape, and a valid data width within the track pitch is narrower than a width of the first read head.

In an additional embodiment, the method for read error recovery in a tape drive may further comprise: performing a read verification for the data, using a second read head associated with a write head, while the data is being written to the tape with the write head of the tape drive.

In addition, various embodiments are directed to tape library system having an error recovery procedure for a tape drive in which one or more aspects of the foregoing methods may be performed.

In addition, various embodiments are directed to a computer program product for read error recovery in a tape drive, the computer program product comprising one or more computer readable storage media, and program instructions collectively stored on the one or more computer readable storage media, the program instructions executable by processing logic tape library to cause the tape library to perform one or more aspects of the foregoing methods.

The above summary is not intended to describe each illustrated embodiment or every implementation of the present disclosure.

Figure 1:
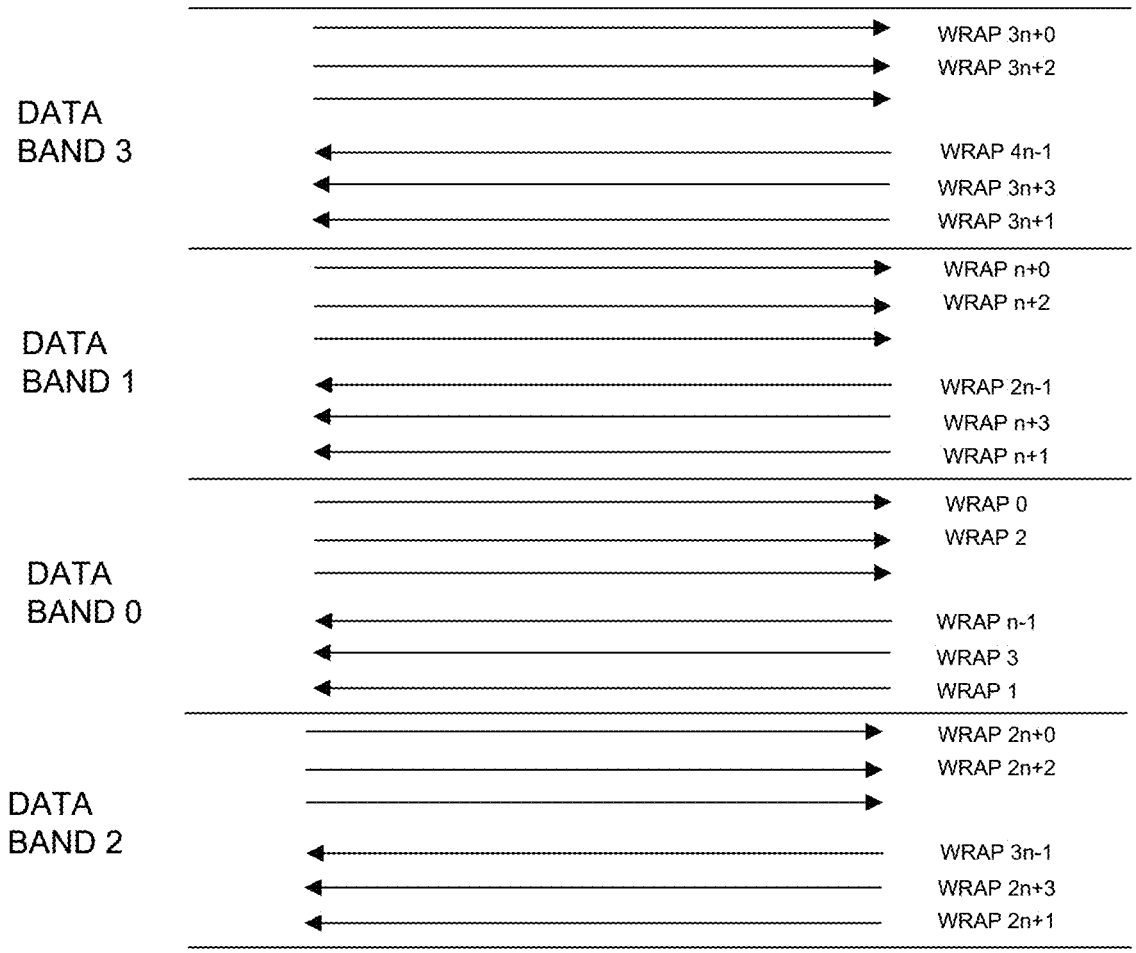
FIG. 1 illustrates a layout of data tracks on a tape medium according to various embodiments.

The same numbers may be used in the Figures and the Detailed Description to refer to the same devices, parts, components, steps, operations, and the like. While the concepts and embodiments described in this disclosure are amenable to various modifications and alternative forms, specifics thereof have been shown by way of example in the drawings and will be described in detail. It should be understood, however, that the intention is not to limit the claims to the particular embodiments described. On the contrary, the intention is to cover all modifications, equivalents, and alternatives falling within the spirit and scope of the invention.

DETAILED DESCRIPTION

Each generation of tape storage device reads and writes data at increasingly higher densities and narrower track width (or track pitch). The tape head, tape path, and media are all subject to wear and debris. Environmental conditions may also cause tape damage or distortion. Errors can occur in written data due to degraded media or other transmission defects when data is read from the tape. The increasingly higher densities and narrower track width may increase the incidence of read errors.

Different tape generations have different data formats and different track pitches. Further, the data written by different tape drive generations have differently size read and write head elements. Additional sources of error are created when an earlier generation tape on which data was written be an earlier generation tape head is subsequently read with a later generation tape drive.

When data is initially written, the tape drive may write the data using a read-while-write operation. In a read-while-write operation, a read head follows the write head, immediately reading the data after it is written. The read-while-write operation effectively defines verified area or region on the tape.

When a tape drive cannot read a data set stored on a magnetic tape medium, an error recovery process is performed. The process may include a sequence of read attempts which reposition the head to re-read data from media. Each retry can change the read speed, and alter dataflow, channel and servo settings in an attempt to successfully read the data. According to one of the error recovery procedures, the tape drive may read the data set by shifting a read head position from the center of the track on which the data was written by an offset. Various embodiments are directed to determining the head shift width or offset value.

The head shift offset that is determined by taking into account the generation of the tape media, the generation of the tape drive that wrote the data, the verified region associated with the tape drive that wrote the data, and the generation of the tape drive currently attempting to read the data may result in a successful read operation.

(1) When the read head of a tape drive that wrote the data entirely runs within a track pitch of a data track, the track pitch being defined by the format of the tape generation, the read head of a tape head reading the data may be set to a position to the range of the write drive's read head ran when the data was written, i.e., within the verified area.

(2) When the read head of a tape drive that wrote the data spans the track pitch border of the tape generation format when the data was written, i.e., the verified area is partly within and partly outside the track pitch of the data track, and the width of the verified area within the track pitch is wider than the read drive's read head width, the read head of a tape head reading the data may be set to a position within the track pitch of the range of the write drive's read head when the data was written, i.e., within the verified area inside the data track.

(3) When read head of a tape drive that wrote the data spans the track pitch border of the tape generation format when the data was written, i.e., the verified area is partly within and partly outside the track pitch of the data track, and the width of the verified area within the track pitch is narrower than the read drive's read head width, the read head of a tape head reading the data may be set to a position at the edge of the track pitch that the write head crossed or spanned on writing data.

FIG. 1 illustrates a layout of data tracks on a tape medium according to various embodiments. A tape medium, e.g., magnetic tape, has a vertical direction (width) and horizontal direction (length). The tape medium is divided into multiple wraps in the vertical direction (width). A drive writes data linearly from the beginning of the tape (BOT) to the end of the tape (EOT) in a forward horizontal direction on even wraps, and then writes data linearly from EOT to BOT in a backward horizontal direction on odd wraps as shown in FIG. 1. The width of each wrap is called the track pitch ($W_{tp}$).

In order to ensure the data is written correctly on the tape medium, a tape drive may be configured to read back the data written to the tape using the read head when writing data to the tape using write head during a write operation. This verify mechanism is called "read while write." When a tape drive reads back data written to the tape at the time of writing the data, the write operation may be referred to as a "read-while-write operation." The drive performs the read-while-write operation on both even and odd wraps (forward and backwards directions).

Figure 3:
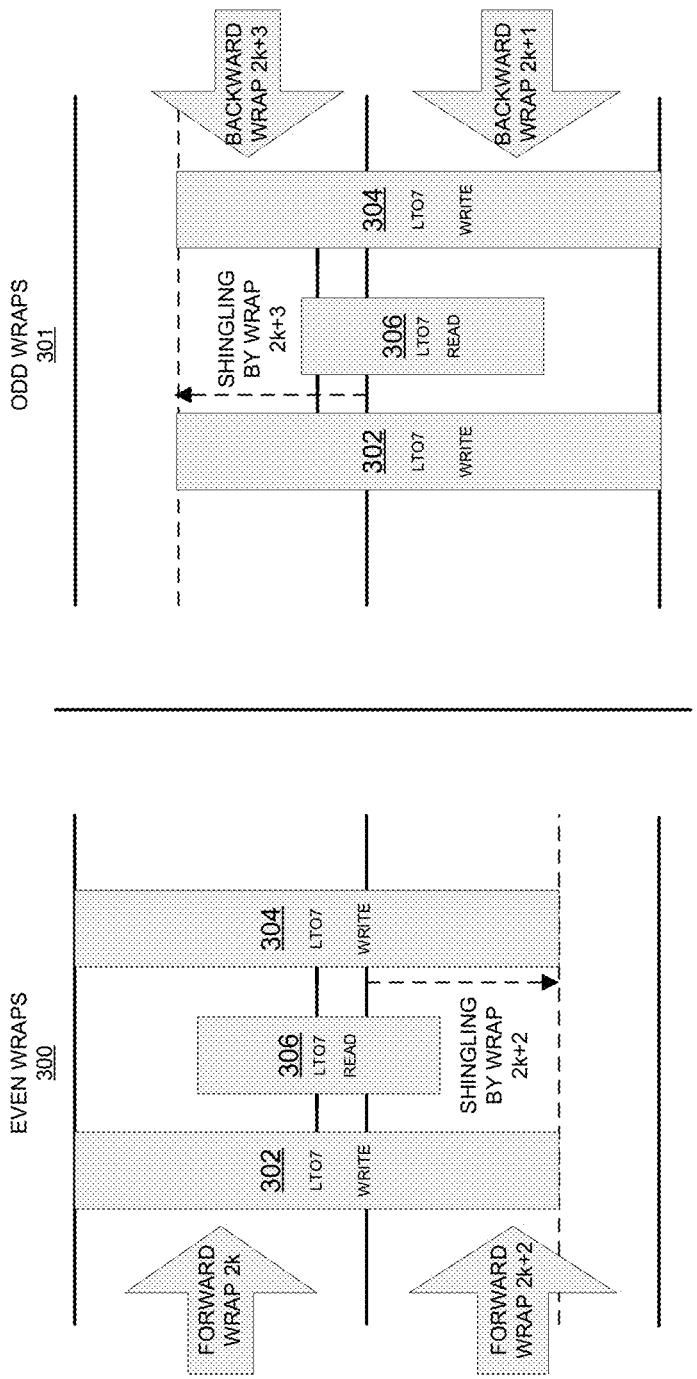
FIG. 3 illustrates a read head positioned between two write heads for use in read-while-write operations according to various embodiments.

FIG. 3 illustrates a read head 306 positioned between two write heads 302, 304 for use in read-while-write operations according to various embodiments. In various embodiments, a tape drive may have at least one write head and one read head. According to various embodiments, a drive is equipped with two write heads 302, 304 and a read head 306 as shown in FIG. 3. The read head 306 is physically sandwiched between the two write heads 302, 304. Because the data is written in both directions (even wraps 300 and odd wraps 301), the read head is positioned at the center of write heads so that the read head will always be behind one of the write heads without regard to whether data is being written in an even or odd wrap, 300 or 301. When a tape drive reads back data written to the tape at the time of writing the data, it effectively defines verified area or region on the tape. The "verified region" corresponds with the width of the read head used in the read-while-write operation and extends horizontally in behind the read head. Because the read head used in the read-while-write operation is narrower than the write head, the width of the verified region will be narrower than the width of region behind the write head in which data is written.

Track placement accuracy is achieved by positioning of the servo readers relative to the data writers. The drive reads servo patterns written on the surface of the tape medium to estimate position of the drive in the vertical (width) position. For example, the drive moves the head to a different vertical (width) position at the end of each wrap prior to reversing direction to read or write data in the opposite direction based on the servo patterns. Tape distortion and marginal writing drive characteristics can alter the optimum track position. According to various embodiments, a positive or negative value may be added to the position offset that servo control would normally choose when a recovery process is invoked.

Figure 4:
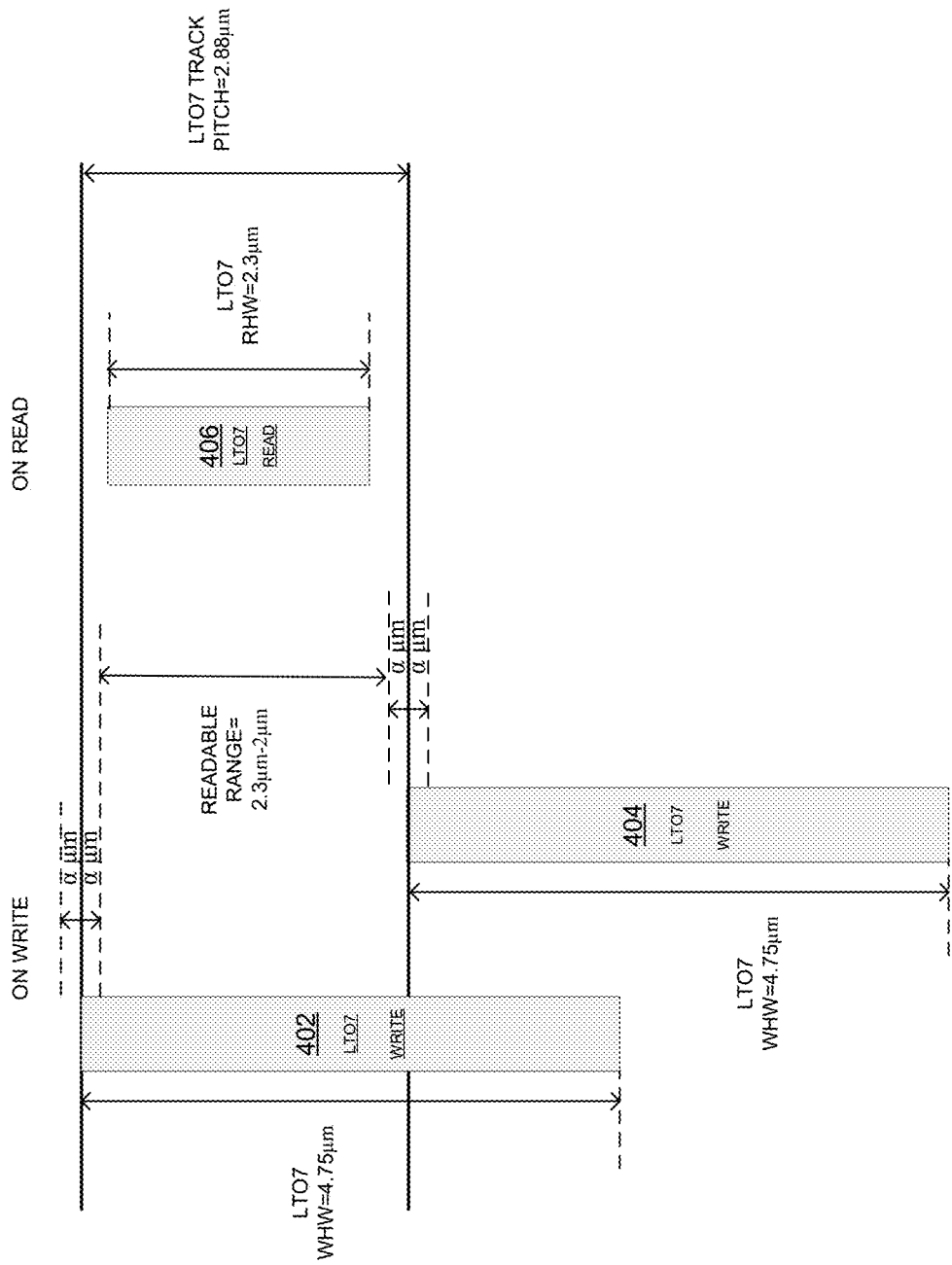
FIG. 4 illustrates tolerance of position error on writing data according to various embodiments.

FIG. 4 illustrates tolerance of position error on writing data according to various embodiments. If the drive position moves unexpectedly, such as due to debris on the tape or head surface, or distortion of the tape, the drive would may write data on the next wrap. In order to avoid this problem, the drive drops the write enable signal forcibly when the drive detects that the position error becomes larger than predefined width as shown in FIG. 4. FIG. 4 shows positions of write heads 402, 404 when data is written to a track in a read-while-write operation (an associated read head is omitted for clarity). If a write head 402, 404 is out of position by greater than plus or minus α µm, a write head position error occurs. The position of a read head 406 when data is read from the track in a read operation is also shown. The read head 406 is of the same tape drive generation as the write heads 402, 404. In a read operation, it may be seen that the initial position of the read head 406 may be in the center of the track The quantity of data stored on a tape medium may be expanded by overlapping portions of data tracks (also referred to as wraps) and thereby increasing the number of data tracks across the tape. This technique is referred to as "shingling." Shingling may be used to adjust written track width for writing narrower tracks using wider legacy writers which enables backward compatibility. When the drive writes data on the next wrap, the write head overwrites the data (shingling) that exceeds the track pitch of previous wrap because the write head width $W_{WH}$ is wider than the track pitch $W_{tp}$. The drive overwrites the shingling area of a bottom side of a previous wrap on even wraps (forward) and a top side of a previous wrap on odd wraps (backward).

Whenever a new generation of tape drive is released, the track pitch becomes narrower than the ones of previous generation tape drives in order to store larger quantity of data on the tape medium. Write head width ($W_{WH}$) is designed as the same width as track pitch of previous tape drive generation. By providing the write head of the new generation with the width of the track pitch of the previous generation, the newer generation tape drive can write data in the previous tape drive generation format. The read head width ($W_{RH}$) of the new generation is narrower than the track pitch of the data format of the new and previous generation. The new generation drive can read back the data stored on the previous generation track pitch using narrower a read head, even though the read head position is shifted by a certain length by the noise. Thus, the newer generation tape drive has the capability to read a tape written by an older generation tape drive.

Figure 2:
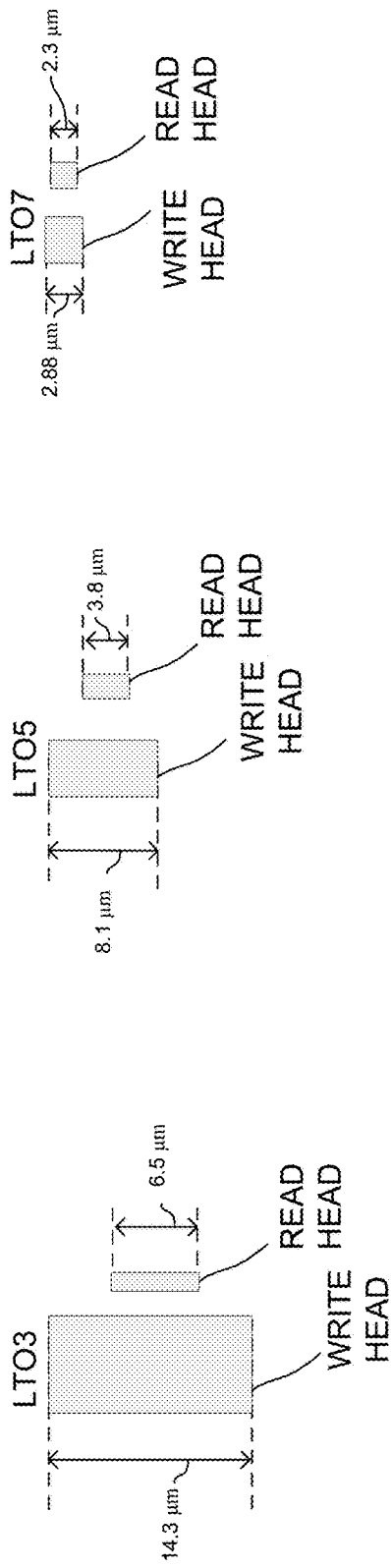
FIG. 2 illustrates track pitch, write head width, and read head width for five generations of tape drive, and example write heads and read heads for three generations of tape drive according to various embodiments.

FIG. 2 shows track pitch, write head width and read head width for five generations of tape drive. FIG. 2 also shows example write heads and read heads for three generations. As can be seen from FIG. 2, the tape drive is required to record data on increasingly narrow track pitches. As track pitch becomes increasingly narrow, position errors due to slight distortion or debris on the surface of the tape medium become more common. (The data shown in FIG. 2 may be stored in a computer memory for use in the embodiments described below.) It should be appreciated that the examples shown in FIG. 2 are examples of only some possible generations of tape drive and the principles of the invention may be applied to any suitable existing or future generation of tape drive, even though it is not depicted in the figure.

In some instances, a drive may not be able to read back data that was written by the same tape drive. While this can be caused by worn tape or degraded tape drive heads, an important reason is that the read head position when the drive writes data on a wrap is different from the read head position when the drive reads data back from the wrap.

Figure 5:
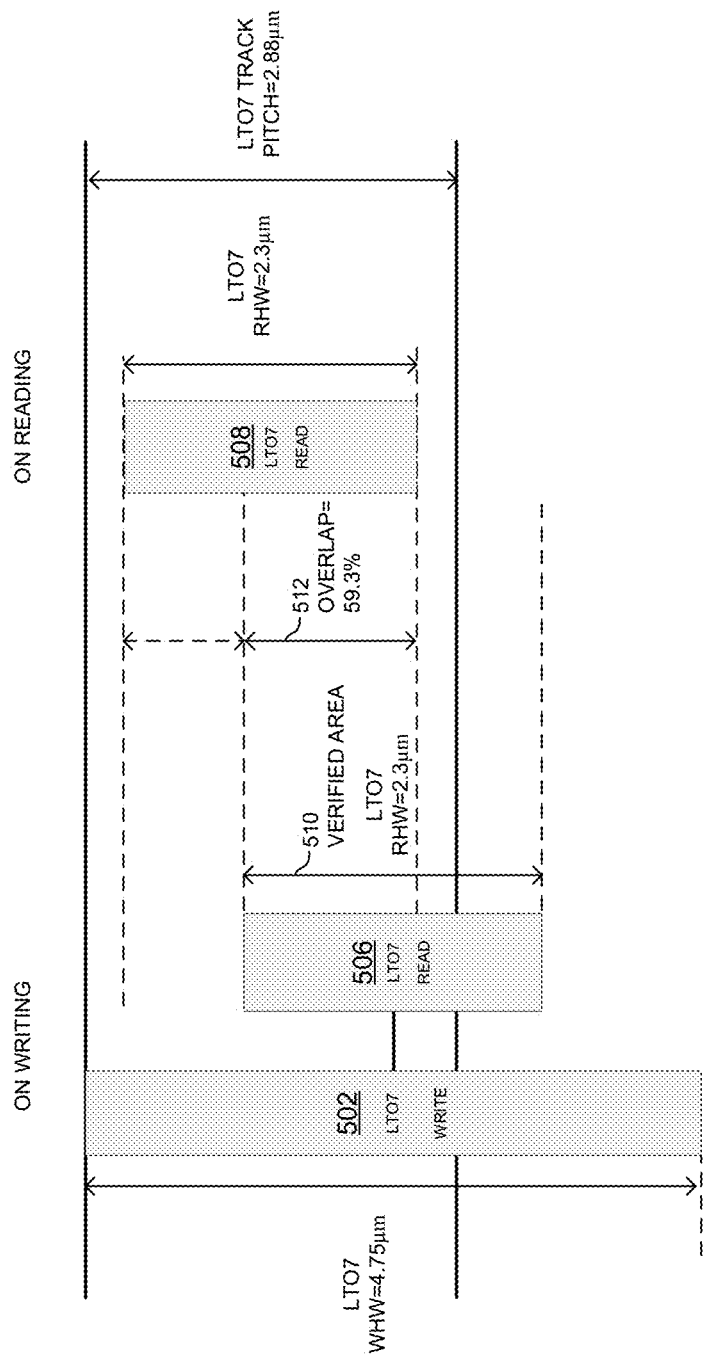
FIG. 5 shows an example of a position of a read head when data is written to a track in a read-while-write operation in comparison to the position of a read head when data is read the from the track in a read operation according to various embodiments.

The position of a read head when a drive writes data on a wrap will be different from the read head position when the drive reads data back the from the wrap due to shingling. This difference can be quantified as an offset or a proportion (percent) of overlap. When a read head of one generation reads data written by a write head of the previous generation, the offset increases and the overlap proportion decreases. Thus, errors may increase when a drive reads data that was written by an earlier generation tape drive FIG. 5 shows an example of a position of a read head 506 when data is written to a track in a read-while-write operation in comparison to the position of a read head 508 when data is subsequently read the from the track in a read operation according to various embodiments. In the example of FIG. 5, the read head 508 and the write head 502 (and associated read head 506) are of the same generation. FIG. 5 shows an LTO7 drive's read head position between read-while-write operation and a normal read on LTO7 tape. The LTO7 track pitch is 2.88 µm, write head width is 4.75 µm, and read head width is 2.3 µm. As mentioned, in case of a read-while-write operation, the read head is positioned at the center of the write head so that the read head reads back the data from center of the region where the write head is writing data, but, as FIG. 5 shows, this position is out of the LTO7 track pitch. When the drive reads back the data from the tape in a normal read operation, the drive positions the read head to the center of the track pitch. The offset between the respective positions of the read heads is 0.935 µm and only 59.3% of read head width is overlapped.

Figure 6:
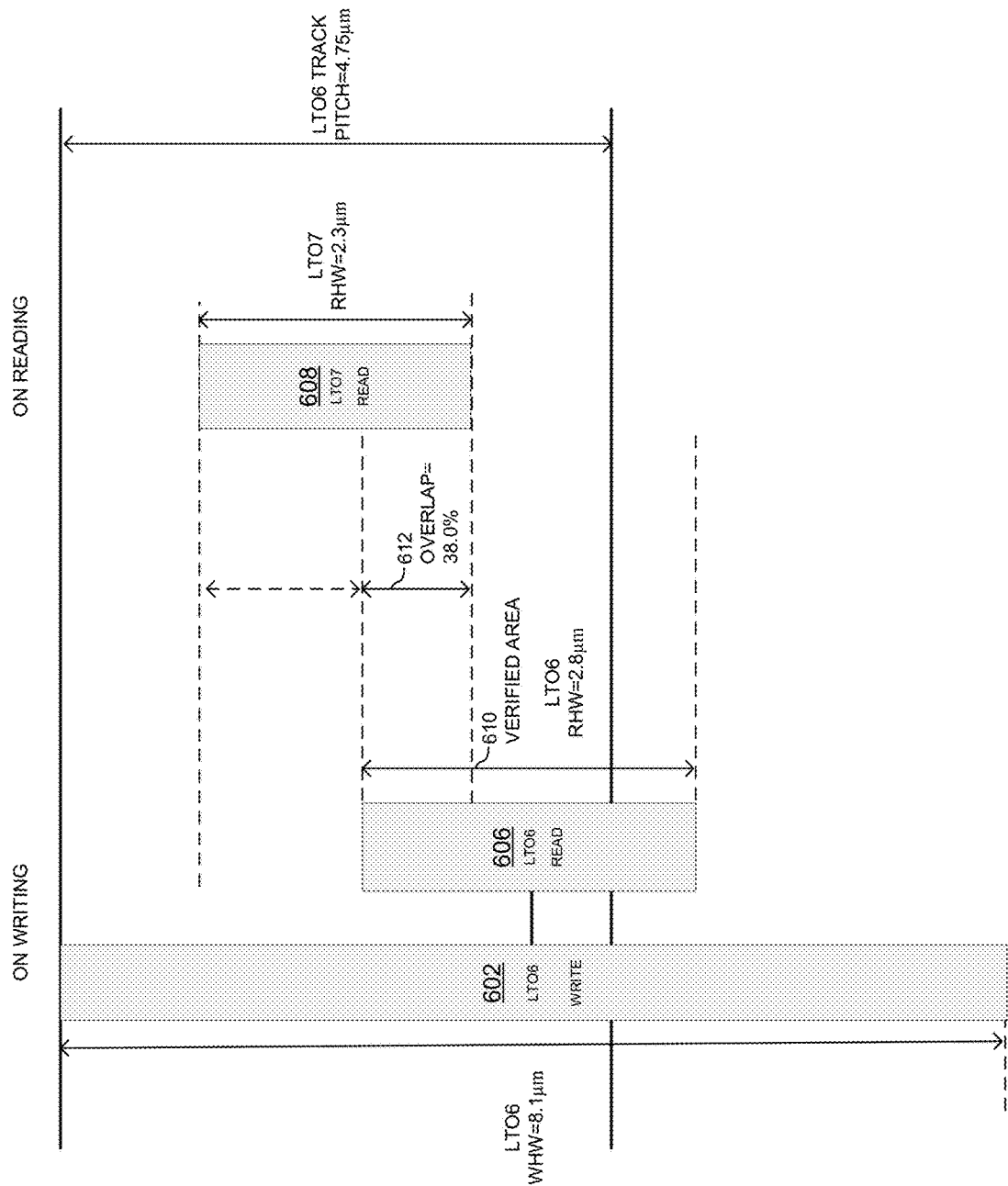
FIG. 6 shows another example of a position of a read head when data is written to a track in a read-while-write operation in comparison to the position of a read head when data is read the from the track in a read operation according to various embodiments.

FIG. 6 shows another example of a position of a read head 606 when data is written to a track in a read-while-write operation in comparison to the position of a read head 608 when data is read from the track in a read operation according to various embodiments. In the example of FIG. 6, the read head 608 is of one generation and the write head 602 (and associated read head 606) are of a previous generation. FIG. 6 shows the case when an LTO7 tape drive reads data on an LTO6 tape that was written by an LTO6 tape drive. The LTO6 track pitch is 4.75 µm, write head width is 8.1 µm, and read head width is 2.8 µm. When the drive reads back the data from the tape in a normal read operation, the drive positions the read head to the center of the track pitch. The position of the read head in the read-while-write operation using the LTO6 tape drive is offset 1.425 µm from the position of the read head in a normal read operation when reading data back using the LTO7 read head. In addition, only 38.0% of the widths of the respective positions of the read heads is overlapped.

Figure 7:
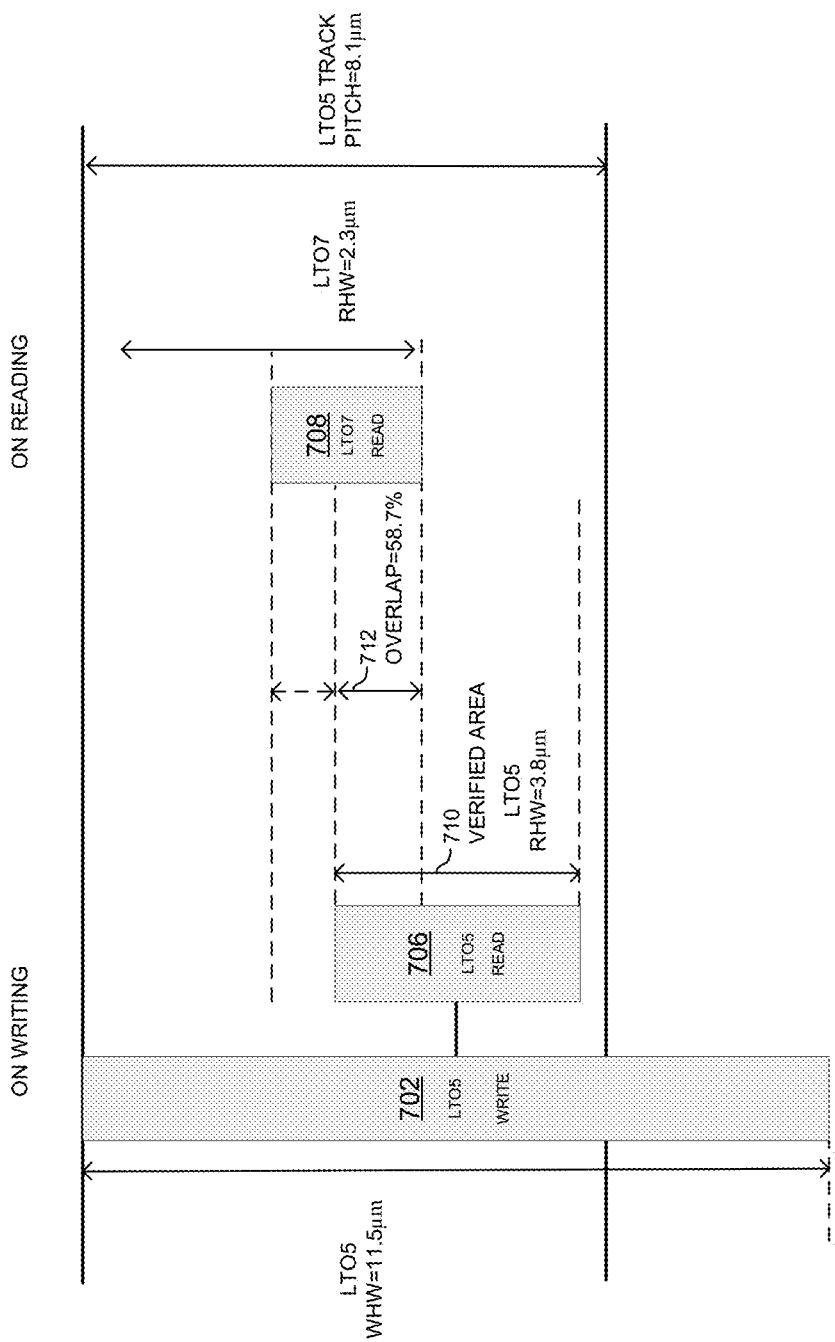
FIG. 7 shows another example of a position of a read head when data is written to a track in a read-while-write operation in comparison to the position of a read head when data is read the from the track in a read operation according to various embodiments.

FIG. 7 shows another example of a position of a read head 706 when data is written to a track in a read-while-write operation in comparison to the position of a read head 708 when data is read from the track in a read operation according to various embodiments. In the example of FIG. 7, the read head 706 is of one generation and the write head 702 (and associated read head 706) are of a previous generation. FIG. 7 shows the case when LTO7 tape drive reads data on an LTO5 tape that was written by LTO5 tape drive. LTO5 track pitch is 8.1 µm, write head width is 11.5 µm, and read head width is 3.8 µm. The position of the read head in the read-while-write operation using the LTO5 tape drive is offset 0.95 µm from the position of the read head in a normal read operation when reading data back using the LTO7 drive. In addition, only 58.7% of the widths of the respective positions of the read heads is overlapped.

According to various embodiments, when data written on a tape cannot be read, an error recovery procedure (ERP) for reading is performed. The ERP repeatedly changes the settings of the drive (e.g., channel, data flow, or head settings) and repeats the read operation until the tape can be read. The ERP may be performed about seventy (70) times at most, and if the data still cannot be read, an error is returned to the host. The ERP may include several options or alternative error recovery methods.

According to various embodiments, an ERP method shifts the read head position. The shift width may be determined from a particular ratio, e.g., ⅔ of the head margin. The head margin is the distance from the read head edge to the track pitch edge. The shift width can be expressed by the following equation:

$$d = \pm(W_{tp}/2 - W_{RH}/2) \times \tfrac{2}{3}$$

The above ERP method of shifting the read head position based on a particular ratio does not take the read head position during a read-while-write operation into account, verified area, and read head width. Shifting the read head position by a particular ratio may not result in a successful read or may require trying a high number of positions before a read attempt is successful. On the other hand, shifting the read head position by an amount determined by a formula that takes more information into account than a simple ratio may result in a successful read.

Various embodiments are directed to an ERP method that takes that position of the read head during a read-while-write operation, verified area, and read head width into account when determining an amount to shift a read head during a normal read operation. These embodiments may be referred to as an offset ERP method.

Figure 8:
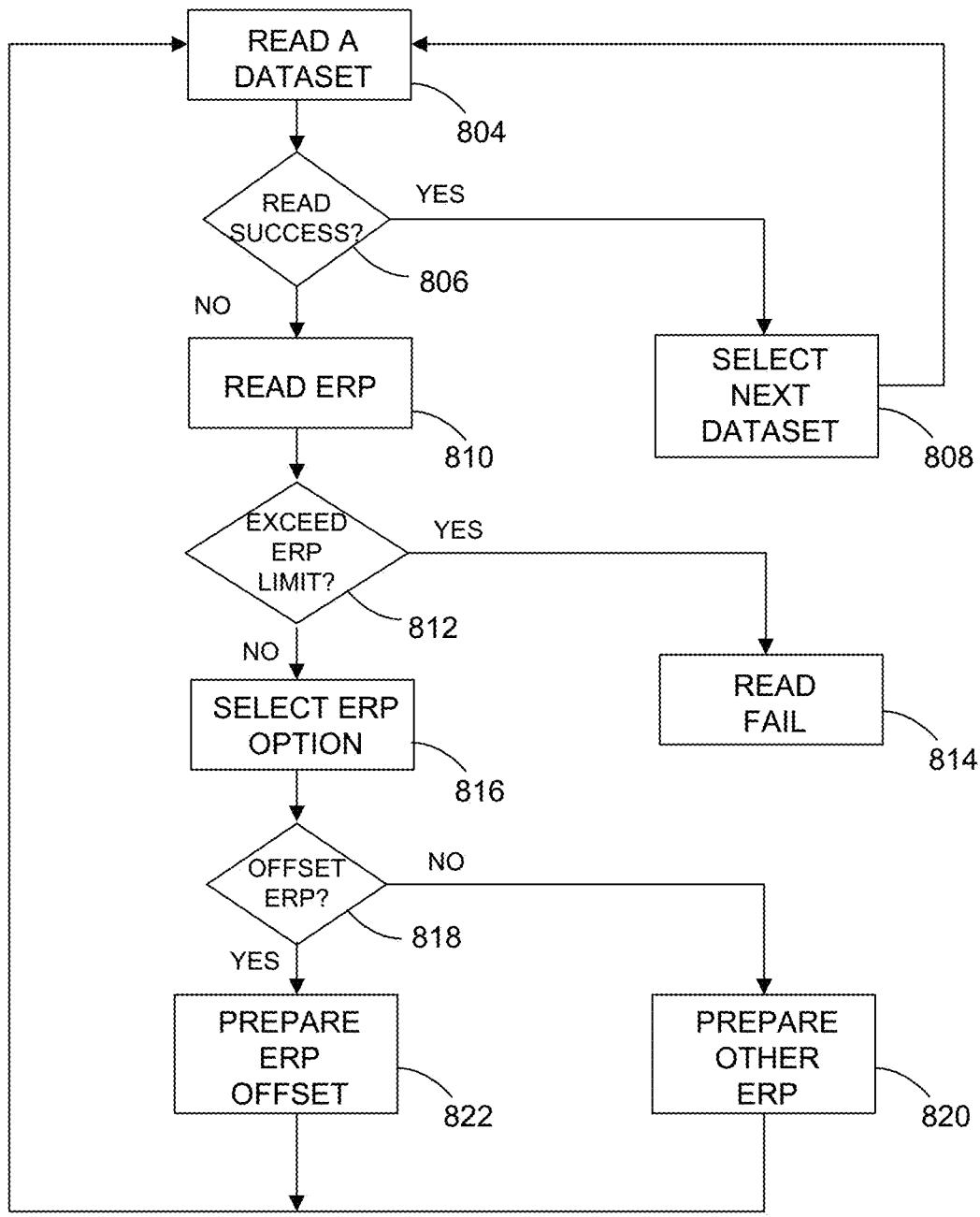
FIG. 8 depicts a read method that includes an error recovery procedure according to various embodiments.

These embodiments may be incorporated into the read method shown in FIG. 8.

FIG. 8 depicts a read method (800) that includes an ERP. An operation to read a particular data set from specified location on a tape media is performed (804). It is determined whether the read operation was successful (806). If the read operation was successful, the method loops to select next data set to be read (808). If the read operation was not successful, the method proceeds to the read ERP (810). At read ERP (810), attempts are repeatedly made to read the data set. At 812, it is determined whether the ERP limit has been exceeded. Examples of ERP limits are: 10, 20, 30, 40, 50, 60, 70. If the ERP limit has been exceeded, the read fails (814). On the other hand, if the ERP limit has not been exceeded, one of the various ERP options may be selected (816). At 818, it is determined whether the offset ERP option is selected. If the offset ERP option is not selected, the method proceeds to another selected ERP method (820). If the offset ERP option is selected, the method proceeds to the offset ERP method (822).

When the offset ERP method is selected at 822, the position of the read head is moved to a position where reading was performed during the read-while-write operation in which the data set was written. The position of the read head is shifted from the center of the track pitch by a particular width. The width by which the read head is shifted from the center of the track is referred to herein as an offset. Various embodiments are directed to calculating a value for this offset.

A tape drive reads and writes on a tape on the data set basis. Each data set includes data called a data set information table (DSIT) registered thereto which includes meta information, such as a data set number. One of the pieces of the meta information is information on the tape drive that wrote the data set. When the data set cannot be read, but the DSIT can be read, information on the generation of the tape drive that wrote the data set can be acquired. In an operation 912 described below, various values that may be used to calculate an offset are described.

Figure 9:
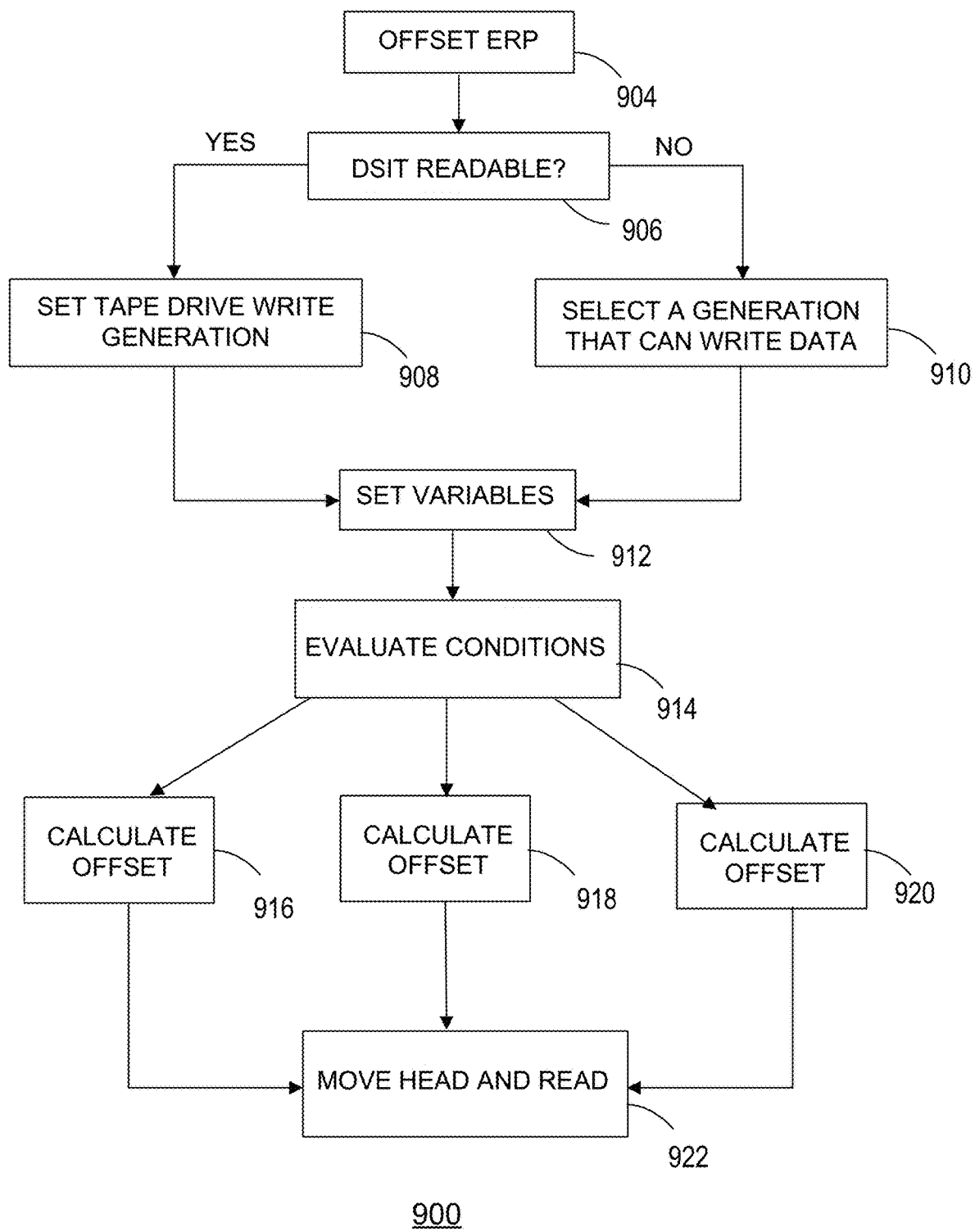
FIG. 9 illustrates a process for determining an offset value for use in an offset method of an error recovery procedure.

FIG. 9 shows a process 900 for determining an offset value for use in the offset ERP method. When the offset ERP option is selected at 818, an offset value is calculated according to the process shown in FIG. 9. The offset value is a width by which the head is shifted from the center of the track. After the offset value is calculated, the position of the read head of the drive is shifted from the center of the track pitch by the offset value to a new position. A normal read operation to read the data set with the read head at new position is then performed. The new position of the read head corresponds with the position where reading was performed by the read head associated with the write head during the read-while-write operation when this data set was originally written the track.

A tape drive reads and writes on a tape on the data set basis. Each data set has data called a data set information table (DSIT) registered thereto which includes meta information, such as a data set number. One of the pieces of the meta information is information on the tape drive that has written this data set.

The process 900 is entered at 904. At 906, it is determined whether the DIST can be read. When the data set cannot be read, but the DSIT can be read, information on the generation ($g_w$) of the tape drive that originally wrote the data set can be acquired. When the generation of the tape drive that originally wrote the data set can be acquired, the write head width of drive of that generation is used ("Set $g_w$") at 908.

In contrast, when the tape drive generation cannot be acquired, the method proceeds to 910 ("Select one generation that can write the data"), a tape drive generation is selected from a set of the generations that are capable of writing the data set on the tape. For example, if the data set is written in the format of LTO6 tapes, then it is known (from the data in FIG. 2) that LTO6 drives and LTO7 drives can write data to the tape. Since ERP is repeatedly performed, when the data set cannot be read with the head width of a first selected generation, second, third and further tape drive generations can be selected at 910 from the rest of the set of tape drive generations, e.g., the generations shown in FIG. 2, and the method may be repeated for each generation until the data set is successfully read. Thus, it is possible to attempt to read the data with the offsets related to the write head widths of all of the tape drive generations that are capable of writing the data set. Regarding the order of selection, using the write head width of the same tape drive generation as that of the drive that wrote a data set that previously (and most recently) successfully read may be efficient and may be selected first. However, in other embodiments, a different order of selection may be used, e.g., successive generations from newest to oldest, or oldest to newest.

At 912, the following values used to calculate an offset are set for the selected generation:

$g_r$: the generation of the drive that reads the data set.

$g_w$: the generation of the drive that wrote the data set (or if unknown, a selection of a drive from the drives that are capable of writing the data set).

g: the generation of the data format written on the tape.

$W_{RH}(g_r)$: the width of the read head of the drive that reads data.

$W_{WH}(g_w)$: the width of the write head of the drive that wrote the data set.

$W_{tp}(g)$: the track pitch of the data format written on the tape.

α: the shift width of the head that keeps writing without halting writing during data writing.

In various embodiments, the DSIT may store one or more of the various values described above with respect to operation 912. In addition, a value "g" for the tape generation format may be obtained from data stored in a memory for a particular tape cartridge.

Once the values used to calculate an offset for the selected generation are set. Several conditions are evaluated. At 914, it is determined whether a first inequality (Condition 1) is satisfied.

$$W_{WH}(g_w)/2 + W_{RH}(g_r)/2 < W_{tp}(g) - \alpha \qquad \text{Condition 1:}$$

Condition 1 corresponds with a case in which the read head of the drive that wrote the data on the tape media in a read-while-write operation ran entirely within the track pitch or width of the data track or wrap. When Condition 1 is satisfied, an offset is determined at 916 and the read head is moved to a position based on the calculated offset at 922, which will be in the center of the write head width of the drive that wrote the data set entirely within the track pitch. Because the read head used during a normal read operation may be narrower than the verified region verified by the read head in the read-while-write operation, it may be possible to move the read head to two or more positions. As such, the determination of an offset at 916 may comprise calculating a maximum and a minimum offset. Operation 922 may include performing a read operation at the position the read head was moved to.

Figure 10:
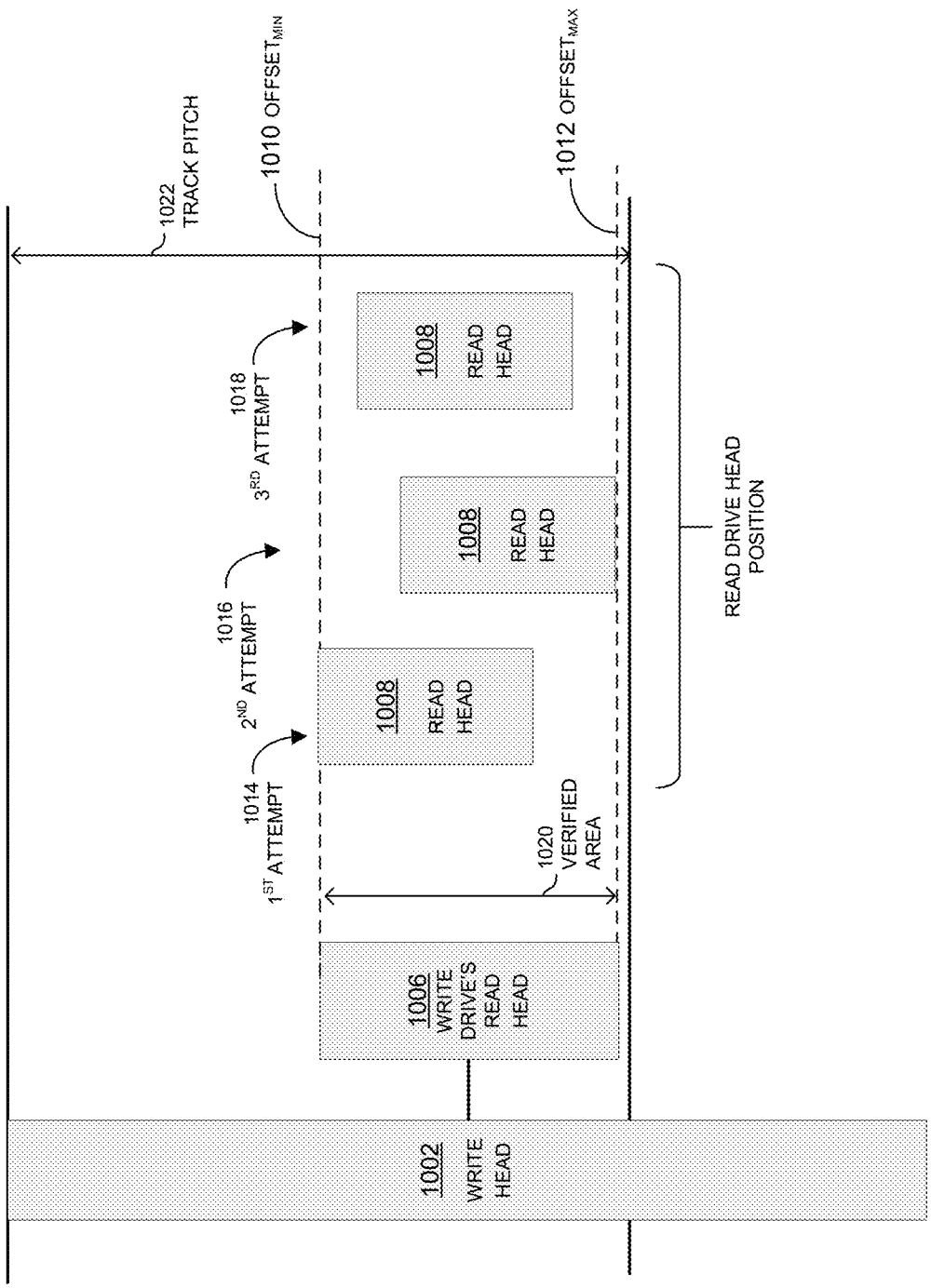
FIG. 10 illustrates an example of various positions of a read head used in a read operation relative to a write head and its associated read head used in a read-while-write operation, wherein the various positions of the read head are determined by an offset method according to various embodiments.

FIG. 10 illustrates an example of various positions of a read head 1008 used in a normal read operation relative to a write head 1002 and its associated read head 1006 used in a read-while-write operation, wherein the various positions or offsets of the read head 1008 used in a normal read operation are determined by an offset method according to various embodiments. As shown in FIG. 10, the data set can be completely read from the area verified 1020 in the read-while-write operation, by fixing the read head 1008, for reading, in a position within the width of the read head of the drive that wrote the data set. For example, it is possible that data is read in the position Offset$_{min}$ (1010) for a first ERP iteration 1014, data is read in the position Offset$_{max}$ (1012) for the next iteration of the ERP 1016, and data is read in the middle position between Offset$_{min}$ and Offset$_{max}$ for the third ERP iteration 1018. Once the data set is correctly read, the ERP method may be stopped. The travel distance offset from the center of the track pitch (1022) at the time is expressed by:

$$\text{Offset}_{min} \leq \text{Offset} \leq \text{Offset}_{max}, \text{ where:}$$

$$\text{Offset}_{min} = [W_{WH}(gw) - Wtp(g) - \{W_{RH}(gw) - W_{RH}(gr)\}]/2$$

$$\text{Offset}_{max} = [W_{WH}(gw) - Wtp(g) + \{W_{RH}(gw) - W_{RH}(gr)\}]/2$$

At 914, it may be determined that the first inequality (Condition 1) is not satisfied. If this is the case, it may be determined whether a second inequality (Condition 2) is satisfied at 914.

$$Wtp(g) - W_{WH}(gw)/2 + W_{RH}(gw)/2 > W_{RH}(gr) \quad \text{Condition 2}$$

Condition 2 corresponds with a case in which the read head of the drive that wrote the data on the tape media in a read-while-write operation ran partly within the track pitch of the data track and partly outside the track pitch of the data track. In other words, the area verified by the read head in the read-while-write operation crosses the border or boundary of the pitch of the data track. In the state where Condition 1 is not satisfied and Condition 2 is satisfied, the read head of the drive that wrote the data set is out of the track pitch. In addition, Condition 2 corresponds with a case in which the verified area within the track pitch is wider than the width of the read head. When Condition 2 is satisfied, an offset is determined at 918 and the read head is moved to a position based on the calculated offset at 922. Because the read head used during a normal read operation may be narrower than the verified region verified by the read head that falls within the boundaries of the data track, it may be possible to move the read head to two or more positions. As such, the determination of an offset at 918 may comprise calculating a maximum and a minimum offset. Operation 922 may include performing a read operation at the position the read head was moved to.

Figure 11:
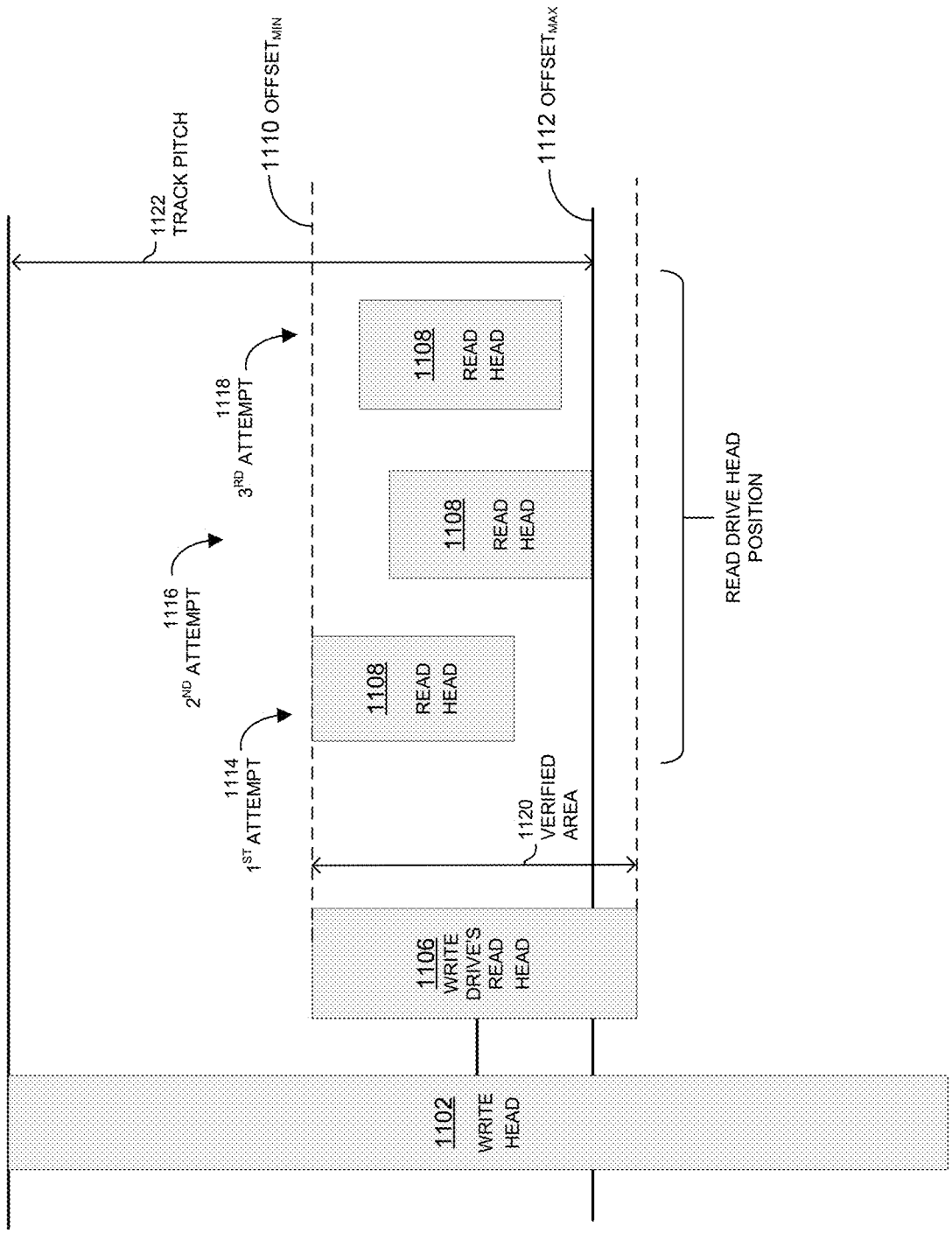
FIG. 11 illustrates another example of various positions of a read head used in a read operation relative to a write head and its associated read head used in a read-while-write operation, wherein the various positions of the read head are determined by an offset method according to various embodiments.

FIG. 11 illustrates example of various positions of a read head 1108 used in a read operation relative to a write head 1102 and its associated read head 1106 used in a read-while-write operation, wherein the various positions of the read head are determined by an offset method according to various embodiments. As shown in FIG. 11, the data set can be completely read from the area verified 1120 by the read-while-write operation, by fixing the read head 1108, for reading, in a position within the width of the read head 1106 of the drive that wrote the data set. For example, it is possible that data is read in the position Offset$_{min}$ (1110) for a first ERP iteration 1114, data is read in the position Offset$_{max}$ (1112) for the next ERP iteration 1116, and data is read in a middle position between Offset$_{min}$ and Offset$_{max}$ for a third ERP iteration 1118. Once the data set is correctly read, the ERP method may be stopped. The travel distance offset from the center of the track pitch (1122) at the time is expressed by:

$$\text{Offset}_{min} \leq \text{Offset} \leq \text{Offset}_{max}, \text{ where:}$$

$$\text{Offset}_{min} = [W_{WH}(gw) - W_{tp}(g) - \{W_{RH}(gw) - W_{RH}(gr)\}]/2$$

$$\text{Offset}_{max} = W_{tp}(g)/2 - W_{RH}(gr)/2 - \alpha$$

At 914, it may be determined that neither Condition 1 or Condition 2 is satisfied. The second inequality may be satisfied, but Condition 2 also requires that the verified area within the track pitch is wider than the width of the read head. If the width of the read head in a normal read operation is wider than the area verified by the read head during the read-while-write operation, then condition 2 is not satisfied. When neither Condition 1 or Condition 2 is satisfied, the method proceeds to 920. If neither Condition 1 or Condition 2 is satisfied, the read head of the drive that wrote the data set is out of the track pitch, and the area verified by the read-while-write operation within the track pitch is narrower than the width of the read head. In other words, operation 920 corresponds with a case in which the read head of the drive that wrote the data on the tape media in a read-while-write operation ran partly within the track pitch of the data track and partly outside the track pitch of the data track, and the width of the read head is wider than the verified area within the track pitch. An offset to be used in moving the read head into position during a normal read operation may be determined at operation 920.

Figure 12:
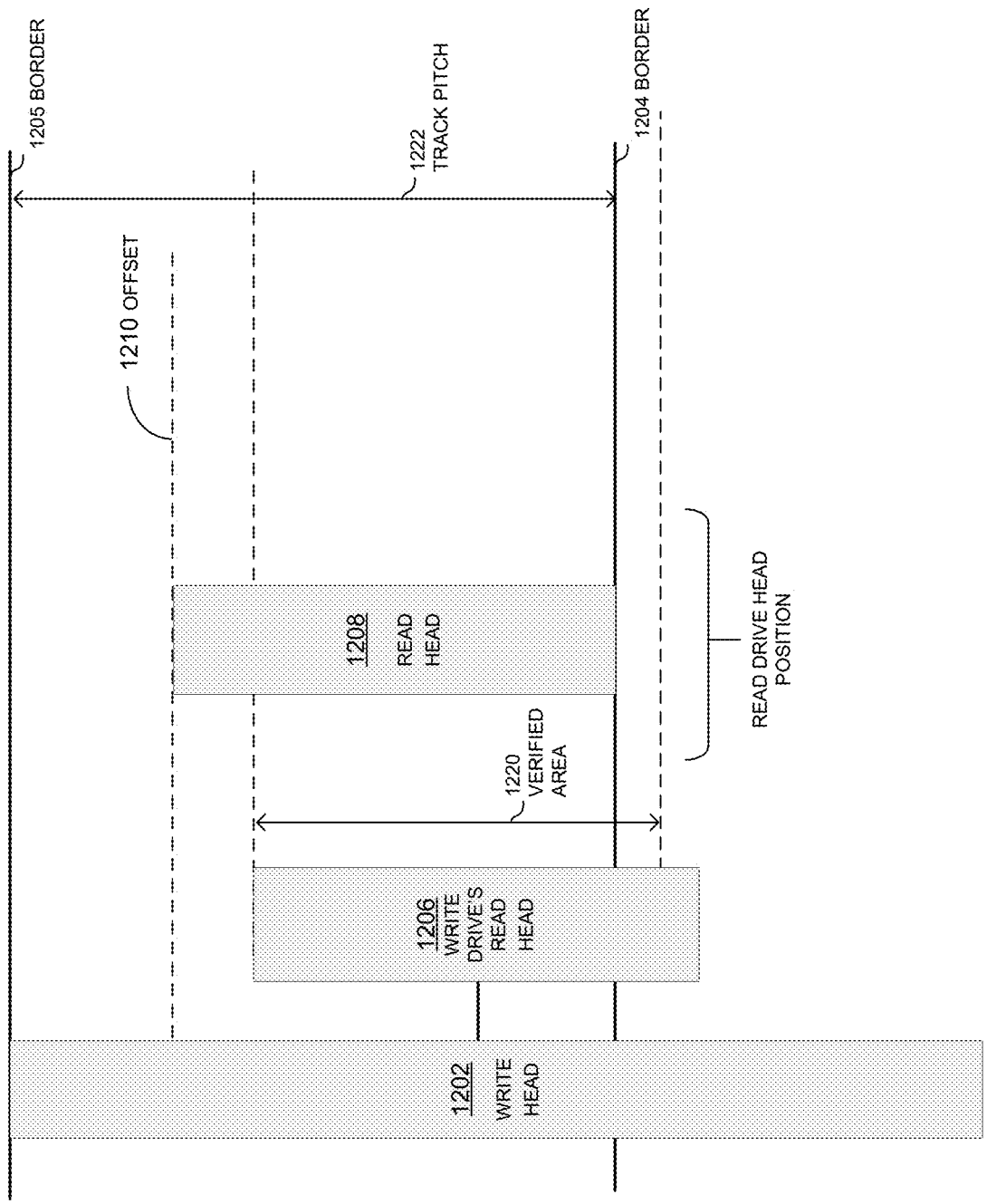
FIG. 12 illustrates another example of a position of a read head used in a read operation relative to a write head and its associated read head used in a read-while-write operation, wherein the position of the read head is determined by an offset method according to various embodiments.

FIG. 12 illustrates another example of a position of a read head 1208 used in a read operation relative to a write head 1202 and its associated read head 1206 used in a read-while-write operation, wherein the position of the read head 1208 is determined by an offset method according to various embodiments. As shown in FIG. 12, the read head 1206 used by the drive that wrote the data set is out of the track pitch 1222 (which extends from a bottom border 1204 to a top border 1205), and data written in another wrap comes in as noise, which makes it difficult to read data. To solve this problem, the read head 1208 is moved, using the offset determined at 920, as close as possible to the next wrap so that as many signals as possible can be acquired from the verified area 1220 from which data was read during the read-while-write operation at the time of writing. That is, the read head may be set to a position at (or very near) a boundary or border, e.g., border 1204, of the data track the write head crossed when the data set was written. The boundary of the track pitch the write head crossed when the data set was written may be on the bottom or top side of the data track. The travel distance offset from the center of the track pitch at this time is expressed by:

$$\text{Offset} = W_{tp}(g)/2 - W_{RH}(gr)/2 - \alpha.$$

Table 1 shows a comparison between when the center of the track pitch is read upon normal reading and when the read head is moved by an offset according to embodiments of the present invention. The comparison is in terms of how much the area that the read head passes through overlaps with the area verified by the read-while-write operation at the time of writing. Here, for convenience, $\alpha=0$ in the calculations.

The drive from which data is read is LTO7, and the tapes with data written thereon are LTO7, LTO6, and LTO5. The track pitch, head width, and the like are those shown in FIG. 2. "Read at TP center" represents the percentage of the overlap of the read head used when the center of the track pitch is read upon normal reading, with the area verified by read-while-write operation at the time of writing. "Read with offset" represents the percentage of the overlap with the area verified by the read-while-write operation at the time of writing observed when the read head is shifted by the proposed width for ERP. The table shows that, in the case of the LTO6 tape, for example, upon normal reading, the read head passes through only 38.0% of the area the read head has passed through at the time of writing, while the read head passes through 91.3% of the area when data is read by offsetting the head by the proposed method.

TABLE 1

| Overlapped Read Head Width Ratio | | | |
|---|---|---|---|
| Write drive | LTO7 | LTO6 | LTO5 |
| Track pitch [um] | 2.88 | 4.75 | 8.1 |
| Write head width [um] | 4.75 | 8.1 | 11.5 |
| Read at TP center | 53.9% | 38.0% | 58.7% |
| Read with offset | 72.0% | 91.3% | 100.0% |

In an ERP which uses predetermined offsets, in the case of LTO7, 16 stages of offset width of −71%, −64%, −57%, −50%, −40%, −30%, −20%, −10%, 10%, 20%, 30%, 40%, 50%, 57%, 64%, and 71% are vertically applied to the width from the edge of the read head to the edge of the track (margin width), and data is read for each offset width.

Figure 13:
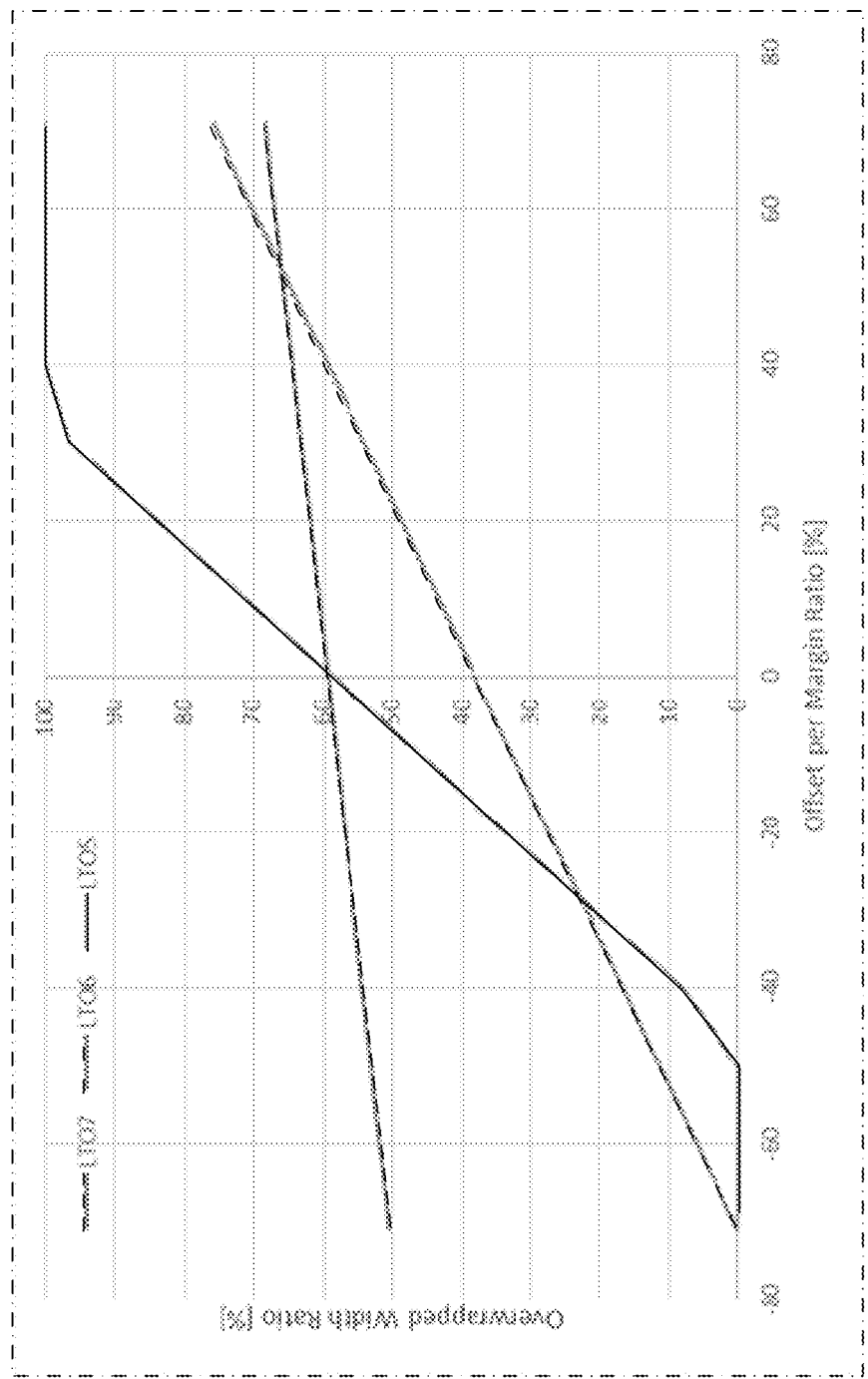
FIG. 13 is a graph of an overwrapped width ratio versus an offset per margin ratio for three generations of tape drive based on the various embodiments.

FIG. 13 is a graph of an overwrapped width ratio versus an offset per margin ratio for three generations of tape drive based on the various embodiments. FIG. 13 shows comparison results showing how much the area that the read head passes through when the tapes of LTO7, LTO6, and LTO5 are read with the LTO7 drive overlaps with the area verified by read-while-write operation at the time of writing.

When a LTO7 or LTO6 tape is read, the percentage of the overlap of the area that the read head passes through with the width of the read head that was used upon writing is less than with the mechanism proposed using all 16 stages of ERP. Similarly, in the case of LTO5, the percentage of the overlap of the area that the read head passes through with the width of the read head that was used upon writing is less than with the mechanism proposed using 11 times of ERP out of 16 stages, although the percentage of the overlap with the head width becomes the same after five times. It should be noted that the overlap width obtained by setting any percentage in the existing ERP does not exceed the overlap width obtained using the proposed mechanism.

Figure 14:
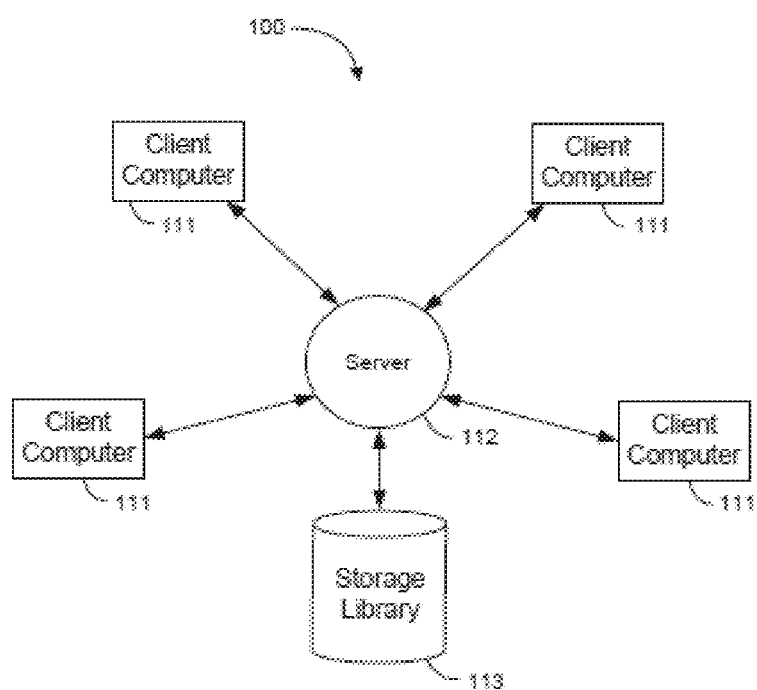
FIG. 14 is a block diagram illustrating a client-server library system in which aspects of the invention may be implemented.

FIG. 14 is a block diagram illustrating a client-server library system in which aspects of the various embodiments of the invention may be implemented. The system 100 includes multiple client computers 111 from which data is transmitted to a server 112 for archiving in a data storage library or tape library 113. The client computers 111 also retrieve previously archived data from the library 113 through the server 112. Client computers 111 may be personal computers, portable devices (e.g., PDAs), workstations, or server systems. The client computers 111 may be connected to the server 112 through a local area network such as an Ethernet network, or by SCSI, iSCSI, Fibre Channel, Fibre Channel over Ethernet, or Infiniband. Similarly, the data storage library 113 may be connected to the server 112 using a high data rate connection such as an optical or copper fiber channel, SCSI, iSCSI, Ethernet, Fibre Channel over Ethernet or Infiniband.

Figure 15:
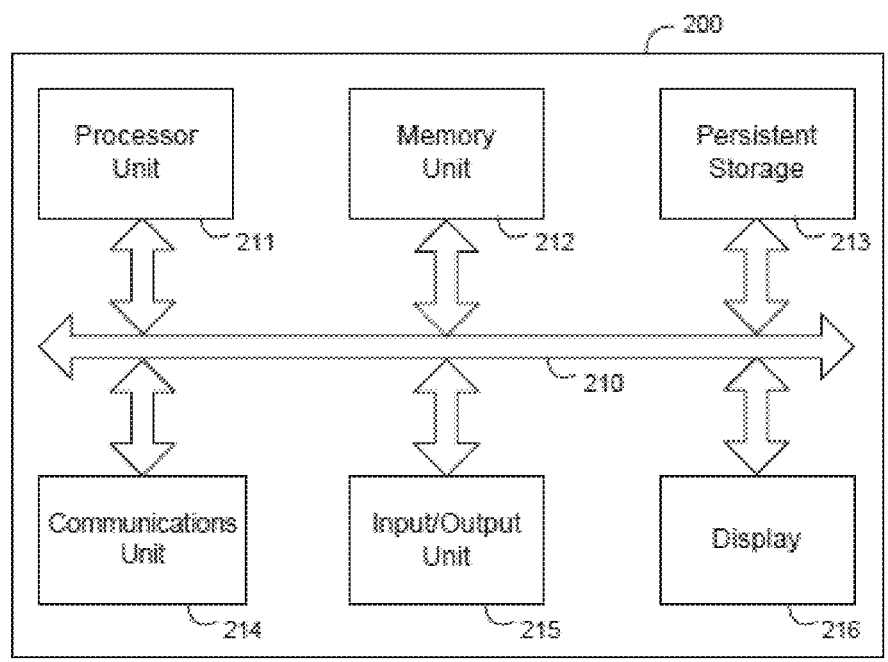
FIG. 15 is a block diagram illustrating a computer system which may be used as a client, server, or host computer according to various embodiments.

FIG. 15 is a block diagram illustrating a computer system which may be used as a client, server, or host computer according to various embodiments. As shown, a computer system 200 includes a processor unit 211, a memory unit 212, a persistent storage 213, a communications unit 214, an input/output unit 215, a display 216 and a system bus 210. Computer programs are typically stored in the persistent storage 213 until they are needed for execution, at which time the programs are brought into the memory unit 212 so that they can be directly accessed by the processor unit 211. The processor unit 211 selects a part of memory unit 212 to read and/or write by using an address that the processor 211 gives to memory 212 along with a request to read and/or write. Usually, the reading and interpretation of an encoded instruction at an address causes the processor 211 to fetch a subsequent instruction, either at a subsequent address or some other address. The processor unit 211, memory unit 212, persistent storage 213, communications unit 214, input/output unit 215, and display 216 interface with each other through the system bus 210.

The tape library 113 may be an automated tape library that accommodates multiple tape drives for reading and writing on tape media, such as single-reel or two-reel magnetic tape cartridges. Examples of the library 113 include IBM TS3400 and TS3500 tape libraries, IBM TotalStorage 3494 Tape Libraries, and IBM 3952 tape Frames model C20, which store magnetic tape cartridges and use IBM TS1130 tape drives. Other examples of the library 113 include IBM TS3310 and TS3100/3200 tape libraries which store magnetic tape cartridges and use IBM LTO (Linear Tape Open) tape drives. A plurality of tape media may be stored in banks or groups of storage slots in tape library 113. Tape media may encompass a variety of media, such as that contained in magnetic tape cartridges, magnetic tape cassettes, and optical tape cartridges, in various formats. For universal reference to any of these types of media, the terms "tape media" or "media" are used herein, and any of these types of containers are referred to as "tape cartridges" or "cartridges" herein. The tape library 113 may include an access robot, including a cartridge picker and a bar code reader mounted on the picker that transports a selected cartridge between a storage slot and a drive.

The tape library 113 further has a library controller which includes at least one microprocessor and other components depicted in computer system 200. The library controller may serve to provide an inventory of the cartridges and to control the library. Typically, the library controller has suitable memory and data storage capability to control the operation of the library. The library controller controls the actions of the access robot, cartridge picker, and bar code reader. In various embodiments, the library controller may execute instructions and issue commands for moving a read head during a read recovery operation. The library controller is interconnected through an interface to one or more host processors, which provides commands requesting access to particular tape media or to media in particular storage slots. A host, either directly, or through the library controller, controls the actions of the data storage drives. Commands for accessing data or locations on the tape media and information to be recorded on, or to be read from, selected tape media are transmitted between the drives and the host. The library controller is typically provided with a database for locating the tape cartridges in the appropriate storage slots and for maintaining the cartridge inventory.

In various embodiments, tape media may be stored in a tape cartridge, which may be referred to as a single-reel cartridge as it includes only one tape reel which acts as a supply reel during operation. A take-up reel is provided in the tape drive for receiving the tape media when the tape media is being unspooled from the tape reel. In a different design of the tape drive, a take-up reel might be included in the cartridge itself rather than in the tape drive. Such a tape cartridge is referred to as a dual-reel cartridge.

Figure 16:
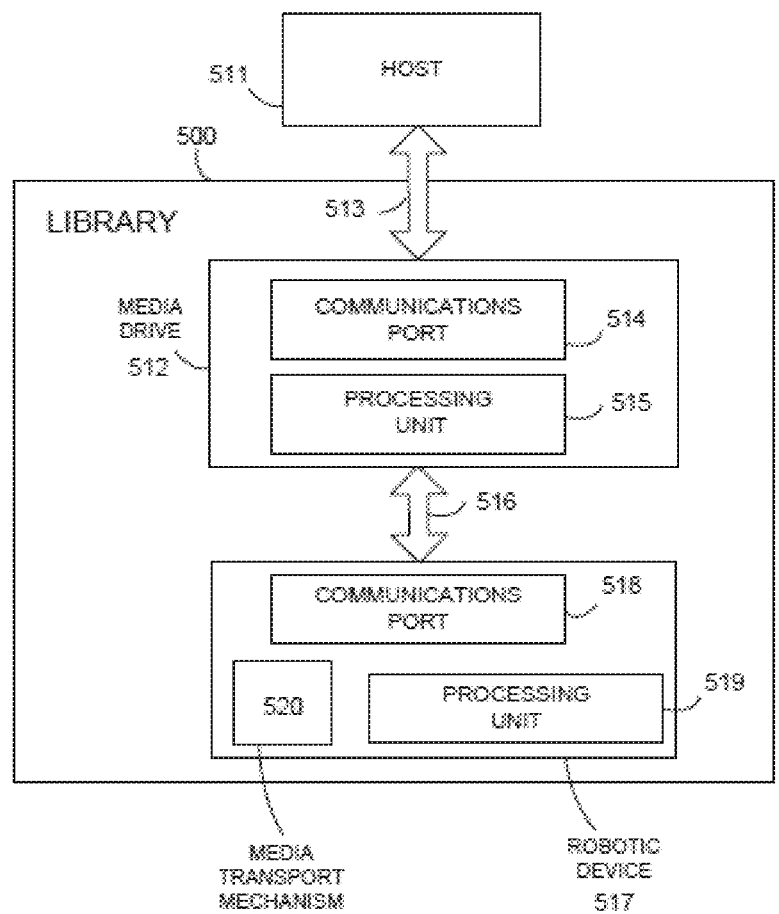
FIG. 16 illustrates a block diagram showing an exemplary data storage tape library in communication with a host computer according to various embodiments.

FIG. 16 illustrates a block diagram showing an exemplary data storage tape library in communication with a host computer according to various embodiments. FIG. 16 shows the functional components of an exemplary data storage tape library 500 in communication with a host computer 511 for providing aspects of the invention. The library 500 is attached to a host 511, and includes a media drive 512 and a robotic device 517. Data and control path 513 interconnects the host 511 and drive 512. Similarly, data and control path 516 interconnects the drive 512 and the robotic device 517. The paths 513 and 516 may comprise suitable means for conveying signals, such as a bus with one or more conductive members (such as wires, conductive traces, cables, etc.), wireless communications (such as radio frequency or other electromagnetic signals, infrared communications, etc.), and fiber optic communications. Furthermore, the paths 513 and 516 may employ serial, parallel, or another communications format, using digital or analog signals as desired. Communications with the media drive 512 and robotic device 517 are through communications ports 514 and 518, respectively.

Both the drive 512 and the robotic device 517 may include respective processing units 515 and 519, e.g., CPUs, processors, controllers. The library 500 manages the positioning and access of removable or portable data storage media such as magnetic tape, cartridge 400, optical tape, optical disk, removable magnetic disk drive, CD-ROM, digital video disk (DVD), flash memory, or another appropriate format. Some of these types of storage media may be self-contained within a portable container, or cartridge. For universal reference to any of these types of storage media, this disclosure refers to them as media.

The host 511 may be a server, workstation, personal computer, or other means for exchanging data and control signals with the media drive 512. The drive 512 comprises a machine for reading data from and/or writing data to exchanging data with a portable data storage media. The robotic device 517 includes the processing unit 519 and a media transport mechanism 520 coupled to processing unit 519. The media transport mechanism 520 includes servos, motors, arms, grippers, sensors and other robotic, mechanical and electrical equipment to perform functions that include (at least) the transportation of media items between the drive 512, various storage bins (not shown), import/export slots, etc. The mechanism 520 may, for example, comprise an auto-loader mounted to the drive 512, a robotic arm housed inside a mass storage library, or another suitable device. As an example, the mechanism 520 may comprise an access robot, cartridge picker and bar code reader.

Aspects of the present disclosure may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for read error recovery in a tape drive, comprising:
    performing a read operation using a first read head, the read operation to read a first data set stored on a first track of a tape media, the first read head having a width, the first track having a track width, the read operation including positioning the first read head at a center of the first track;
    determining that a read error occurred when performing the read operation; and
    in response to determining that the read error occurred when performing the read operation, performing an error recovery procedure, the error recovery procedure including:
        determining whether a second read head of a drive capable of use in a read-while-write operation is configured to run entirely within or run partly outside of the track width of the first track, the second read head having a width corresponding with a particular tape drive generation, the width for the second read head defining a verified area on a track,
        in response to determining that the second read head is configured to run entirely within the track width of the first track, positioning the first read head at a second position, the second position being within the verified area of the second read head.

2. The method of claim 1, wherein the error recovery procedure further comprises:
    performing a read operation using the first read head at the second position.

3. The method of claim 1, wherein the error recovery procedure further comprises:
    selecting a first tape drive generation as the particular tape drive generation from a set of tape drive generations that are capable of writing the data set on the tape media.

4. The method of claim 3, wherein the error recovery procedure further comprises:
    performing a read operation using the first read head at the second position;
    determining that a read error occurred when performing the read operation at the second position; and
    in response to determining that a read error occurred when performing the read operation at the second position, selecting a second tape drive generation as the particular tape drive generation from the set of tape drive generations that are capable of writing the data set on the tape media.

5. The method of claim 1, wherein the error recovery procedure further comprises:
    in response to determining that the second read head is configured to run partly outside of the track width of the first track, determining whether a portion of the verified area within the track width of the first track is wider than the width of the first read head;
    in response to determining that the portion of the verified area within the track width of the first track is wider than the width of the first read head, positioning the first read head at a second position, the second position being within the portion of the verified area of the second read head within the track width of the first track; and
    performing a read operation using the first read head at the second position.

6. The method of claim 1, wherein the error recovery procedure further comprises:
    in response to determining that the second read head is configured to run partly outside of the track width of the first track, determining whether a portion of the verified area within the track width of the first track is wider than the width of the first read head;
    in response to determining that a portion of the verified area within the track width of the first track is not wider than the width of the first read head, positioning the first read head at a second position, the second position being within the portion of the verified area of the second read head within the track width of the first track, and being a position in which a side of the first read head is at a border of the first track; and
    performing a read operation using the first read head at the second position.

7. The method of claim 1, wherein the error recovery procedure further comprises:
    determining whether a data set information table was successfully read from the track;

in response to determining that the data set information table was successfully read from the track, setting a tape drive generation stored in the data set information table as the particular tape drive generation.

8. A tape library system having an error recovery procedure for a tape drive, comprising:
a first read head;
a processing device for executing program instructions stored in a memory, wherein the processing device performs operations to:
cause a read operation using the first read head to be performed, the read operation to read a first data set stored on a first track of a tape media, the first read head having a width, the first track having a track width, the read operation including positioning the first read head at a center of the first track;
determine that a read error occurred when performing the read operation; and
in response to determining that the read error occurred when performing the read operation, perform an error recovery procedure, the error recovery procedure including:
determine whether a second read head of a drive capable of use in a read-while-write operation is configured to run entirely within or run partly outside of the track width of the first track, the second read head having a width corresponding with a particular tape drive generation, the width for the second read head defining a verified area on a track, and
in response to determining that the second read head is configured to run entirely within the track width of the first track, cause the first read head to be positioned at a second position, the second position being within the verified area of the second read head.

9. The tape library system of claim 8, wherein the error recovery procedure further comprises:
cause a read operation using the first read head at the second position to be performed.

10. The tape library system of claim 8, wherein the error recovery procedure further comprises:
select a first tape drive generation as the particular tape drive generation from a set of tape drive generations that are capable of writing the data set on the tape media.

11. The tape library system of claim 10, wherein the error recovery procedure further comprises:
perform a read operation using the first read head at the second position;
determine that a read error occurred when performing the read operation at the second position; and
in response to determining that a read error occurred when performing the read operation at the second position, select a second tape drive generation as the particular tape drive generation from the set of tape drive generations that are capable of writing the data set on the tape media.

12. The tape library system of claim 8, wherein the error recovery procedure further comprises:
in response to determining that the second read head is configured to run partly outside of the track width of the first track, determine whether a portion of the verified area within the track width of the first track is wider than the width of the first read head;
in response to determining that the portion of the verified area within the track width of the first track is wider than the width of the first read head, position the first read head at a second position, the second position being within the portion of the verified area of the second read head within the track width of the first track; and
perform a read operation using the first read head at the second position.

13. The tape library system of claim 8, wherein the error recovery procedure further comprises:
in response to determining that the second read head is configured to run partly outside of the track width of the first track, determine whether a portion of the verified area within the track width of the first track is wider than the width of the first read head;
in response to determining that a portion of the verified area within the track width of the first track is not wider than the width of the first read head, position the first read head at a second position, the second position being within the portion of the verified area of the second read head within the track width of the first track, and being a position in which a side of the first read head is at a border of the first track; and
perform a read operation using the first read head at the second position.

14. The tape library system of claim 8, wherein the error recovery procedure further comprises:
determine whether a data set information table was successfully read from the track;
in response to determining that the data set information table was successfully read from the track, set a tape drive generation stored in the data set information table as the particular tape drive generation.

15. A computer program product for read error recovery in a tape drive, the computer program product comprising one or more computer readable storage media, and program instructions collectively stored on the one or more computer readable storage media, the program instructions executable by processing logic in a tape library to cause the tape library to:
perform a read operation using a first read head, the read operation to read a first data set stored on a first track of a tape media, the first read head having a width, the first track having a track width, the read operation including positioning the first read head at a center of the first track;
determine that a read error occurred when performing the read operation; and
in response to determining that the read error occurred when performing the read operation, perform an error recovery procedure, the error recovery procedure including:
determine whether a second read head of a drive capable of use in a read-while-write operation is configured to run entirely within or run partly outside of the track width of the first track, the second read head having a width corresponding with a particular tape drive generation, the width for the second read head defining a verified area on a track, and
in response to determining that the second read head is configured to run entirely within the track width of the first track, position the first read head at a second position, the second position being within the verified area of the second read head.

16. The computer program product of claim 15, wherein the error recovery procedure further comprises:
perform a read operation using the first read head at the second position.

17. The computer program product of claim 15, wherein the error recovery procedure further comprises:

select a first tape drive generation as the particular tape drive generation from a set of tape drive generations that are capable of writing the data set on the tape media.

18. The computer program product of claim 17, wherein the error recovery procedure further comprises:
   perform a read operation using the first read head at the second position;
   determine that a read error occurred when performing the read operation at the second position; and
   in response to determining that a read error occurred when performing the read operation at the second position, select a second tape drive generation as the particular tape drive generation from the set of tape drive generations that are capable of writing the data set on the tape media.

19. The computer program product of claim 15, wherein the error recovery procedure further comprises:
   in response to determining that the second read head is configured to run partly outside of the track width of the first track, determine whether a portion of the verified area within the track width of the first track is wider than the width of the first read head;
   in response to determining that the portion of the verified area within the track width of the first track is wider than the width of the first read head, positioning the first read head at a second position, the second position being within the portion of the verified area of the second read head within the track width of the first track; and
   perform a read operation using the first read head at the second position.

20. The computer program product of claim 15, wherein the error recovery procedure further comprises:
   in response to determining that the second read head is configured to run partly outside of the track width of the first track, determine whether a portion of the verified area within the track width of the first track is wider than the width of the first read head;
   in response to determining that a portion of the verified area within the track width of the first track is not wider than the width of the first read head, positioning the first read head at a second position, the second position being within the portion of the verified area of the second read head within the track width of the first track, and being a position in which a side of the first read head is at a border of the first track; and
   perform a read operation using the first read head at the second position.

21. The computer program product of claim 15, wherein the error recovery procedure further comprises:
   determine whether a data set information table was successfully read from the track;
   in response to determining that the data set information table was successfully read from the track, set a tape drive generation stored in the data set information table as the particular tape drive generation.

* * * * *